(12) United States Patent
Kumata et al.

(10) Patent No.: US 6,897,883 B1
(45) Date of Patent: May 24, 2005

(54) OMNIAZIMUTHAL VISUAL SYSTEM (75) Inventors: Kiyoshi Kumata, Kyotanabe (JP); Noritoshi Kako, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/846,297

(22) Filed: May 2, 2001

(30) Foreign Application Priority Data

May 23, 2000 (JP) ........................................ 2000-152207

(51) Int. Cl.$^7$ ................................................ G09G 5/00
(52) U.S. Cl. ....................................................... 345/672
(58) Field of Search .............................. 345/32, 7, 660, 345/666, 667, 668, 672, 682, 649, 656, 619, 625, 627, 628

(56) References Cited

U.S. PATENT DOCUMENTS

| | | | | |
|---|---|---|---|---|
| 5,046,190 A | * | 9/1991 | Daniel | |
| 5,067,019 A | * | 11/1991 | Juday et al. | |
| 5,151,822 A | * | 9/1992 | Hekker et al. | |
| 5,185,667 A | | 2/1993 | Zimmermann | |
| 5,359,363 A | | 10/1994 | Kuban et al. | |
| 5,396,583 A | | 3/1995 | Chen et al. | |
| 5,760,826 A | | 6/1998 | Nayar | |
| 5,790,181 A | | 8/1998 | Chahl et al. | |

FOREIGN PATENT DOCUMENTS

| | | | |
|---|---|---|---|
| JP | 05-115001 A | | 5/1993 |
| JP | 06-295333 A | | 10/1994 |
| JP | 06-295333 | * | 10/1994 |
| JP | 2656143 B2 | | 5/1997 |
| JP | 09-505447 A | | 5/1997 |
| JP | 10-271341 | * | 10/1998 |
| JP | 11-205772 A | | 7/1999 |
| JP | 11-331654 A | | 11/1999 |
| KR | 2000-10900 A | | 2/2000 |
| KR | 2000-17552 A | | 3/2000 |
| WO | WO97/50252 A1 | | 12/1997 |
| WO | 0 982 946 A1 | | 3/2000 |

OTHER PUBLICATIONS

Yamazawa, et al.; "Visual Navigation with Omnidirectional Image Sensor HyperOmni Vision"; Journal of the Institute of Electronics, Information and Communication Engineers, D–11, May 25, 1996, vol. J79–D–II, pp. 698–707.

Yamazawa, et al. "HyperOmni Vision: Visual Navigation with an Omnidirectional Image Sensor" Systems & Computers in Japan, Scripta Technica Journals. New York, US, vol. 28, No 4, Apr. 1, 1997, pp. 36–47, XP000699982.

Baker, et al. "A Theroy of Catadiopric Image Formation" 6$^{th}$ International Conference on Computer Vision. ICCV '98. Bombay, Jan. 4–7, 1998, IEEE International Conference on Computer Vision, New York, : IEEE, US, 1998, pp. 35–42, XP000908968 ISBN: 0–7803–5098–7.

Yamazawa, et al. "Omnidirectional Imaging with Hyperboloidal Projection"Intelligent Robots and Systems '93, IROS '93. Proceedings of the 1993 IEIEE/RSJ International Conference on Yokohama, Japan Jul. 26–30, 1993, New York, USA, IEEE, US, pp. 1029–1034, XP010219360 ISBN: 0–7808–0823–9.

61 USPQ2D, Interactive Pictures Corp. v. Infinite Pictures Inc., U.S. Court of Appeals Federal Circuit, No. 01–1029, Decided Dec. 20, 2001.

* cited by examiner

*Primary Examiner*—Chanh Nguyen
(74) *Attorney, Agent, or Firm*—Birch, Stewart, Kolasch & Birch, LLP (57) ABSTRACT

An omniazimuthal visual system includes: an optical system capable of obtaining an image of 360° view field area therearound and capable of central projection transformation for the image: an imaging section for converting the image obtained through the optical system into image data; an image transformation section for transforming the image data into display data; a display section for displaying a transformed image based on the display data from the image transformation section; and a display control section for controlling the transformed image to be displayed on the display section, wherein the image transformation section includes at least one buffer memory for temporarily storing the image data and the display data, an arithmetic/logic circuit for performing coordinate transformation when the image data is transformed into the display data, a lookup table of a trigonometric function for use in the arithmetic/logic circuit, and a CPU for controlling the at least one buffer memory, the arithmetic/logic circuit, and the lookup table.

10 Claims, 9 Drawing Sheets

Hyperboloidal mirror optical system $$\frac{X^2+Y^2}{a^2} - \frac{Z^2}{b^2} = -1$$

Paraboloidal mirror optical system

FIG. 10 RELATED ART

OMNIAZIMUTHAL VISUAL SYSTEM

BACKGROUND OF THE INVENTION

1. Field of the Invention

The present invention relates to an omniazimuthal visual system for use in a visual sensor, such as surveillance cameras, etc., which has a wide angle of view that enables omniazimuthal observation.

2. Description of the Related Art

In recent years, in the field of visual sensors such as surveillance cameras, etc., in various practical applications, a combination of a camera and a computer executes tasks which would have been carried out by a human with his/her own eyes in conventional applications. In general, a camera used in such applications has a limited angle of view. In some applications, a wide-angle lens (e.g., fisheye lens) is used for the purpose of obtaining a wider angle of view. Furthermore, in the field of mobile robots, studies for practical use of a mirror having a shape of a surface of revolution, such as a conical mirror, a spherical mirror, a hyperboloidal mirror, etc., are energetically carried out for the purpose of obtaining a wide angle of view.

In conventional visual sensors, an omniazimuthal image obtained by an optical system and an imaging device is processed by software used by a computer so as to be transformed into an image which is easier for a human to see, such as a panoramic image or the like.

Figure 10:
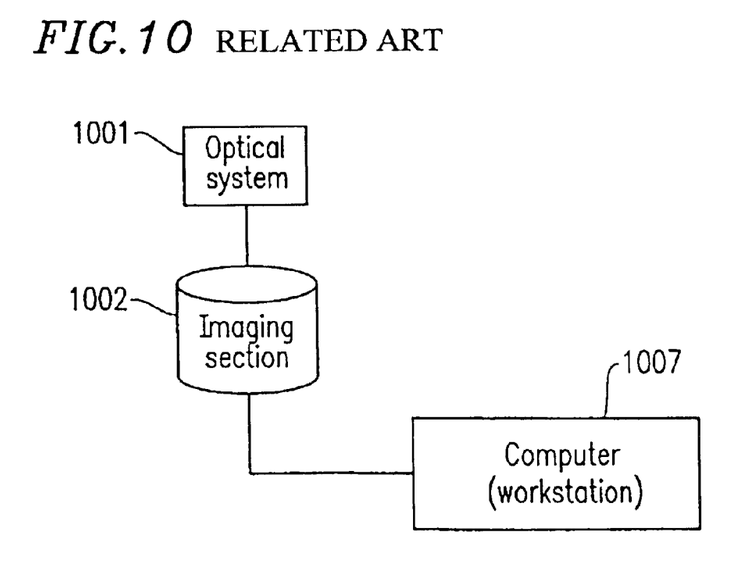
FIG. 10 is a block diagram showing a configuration example of a conventional omniazimuthal visual system 1000.

FIG. 10 shows a conventional omniazimuthal visual system 1000. The omniazimuthal visual system 1000 includes: an optical system 1001 which utilizes a wide angle lens (e.g., fisheye lens) or a mirror having a shape of a surface of revolution (a conical mirror, a spherical mirror, a hyperboloidal mirror, etc.); an imaging section 1002 for converting an optical image obtained by the optical system 1001 into image data; and a computer (workstation) 1007 including an image converter which performs software processing, a display, and a display controller. In this omniazimuthal visual system 1000, a round-shape optical image obtained by the optical system 1001 is converted by the imaging section 1002 into image data of the round-shape image. This image data is supplied to the computer 1007, and processed by the computer 1007 using software into an image which is easier for a human to see, such as a square panoramic image or a perspective image.

The image transformation processing, through which a round-shape optical image is transformed into an image which is easier for a human to see, such as a square panoramic image or a perspective image, requires a number of coordinate transformations by which a polar coordinate is transformed with a trigonometric function into a rectangular coordinate. Furthermore, the coordinate transformation requires high accuracy.

Accordingly, in the conventional omniazimuthal visual system 1000, when the image transformation processing is carried out by software used by the computer 1007, 20 or more steps are required in arithmetic processing for a single data transformation even in the case of using a hyperboloidal mirror. Therefore, the image transformation processing which uses software requires a long processing time.

Among various mirrors having a shape of a surface of revolution, a hyperboloidal mirror is an optical element which enables a precise central projection transformation. With the hyperboloidal mirror, an image transformation can be carried out only with linear operations. On the other hand, in the case of using a wide-angle lens (e.g., fisheye lens) or another type of mirror having a shape of a surface of revolution, such as a conical mirror or a spherical mirror, an image transformation requires nonlinear operations in addition to trigonometric functions. Thus, in the case of using the hyperboloidal mirror, a processing speed is relatively increased as compared with an optical system using a wide angle lens (e.g., fisheye lens) or another type of mirror having a shape of a surface of revolution, such as a conical mirror or a spherical mirror.

Furthermore, when software is used in the image transformation, even in the case where a result of a constant operation is previously stored in a register, it is necessary to frequently repeat a step of reading out this result from a register, when it is required, and temporarily storing a calculation result again in the register. Therefore, a data processing time is determined according to the number of the repetitions of the step.

Although the processing time required for software processing of an image formed by a small number pixels might be short, a considerably longer processing time is required for software processing of an image formed by a greater number of pixels. Thus, for an image formed by 100,000 pixels, the maximum processing speed of the image transformation is several frames per second.

In the case of a still image, a long software processing time does not matter greatly. Therefore, a high resolution picture can be obtained even with a conventional omniazimuthal visual system. However, in the case of a dynamic image, along with an increased number of pixels, the processing speed of the software processing decreases so that the software processing cannot catch up with a required processing speed for dynamic images. As a result, the quality of the images obtained is significantly deteriorated. Thus, higher processing speed is required for processing of a dynamic image.

SUMMARY OF THE INVENTION

According to one aspect of the present invention, an omniazimuthal visual system includes: an optical system capable of obtaining an image of 360° view field area therearound and capable of central projection transformation for the image; an imaging section for converting the image obtained through the optical system into image data; an image transformation section for transforming the image data into display data; a display section for displaying a transformed image based on the display data from the image transformation section; and a display control section for controlling the transformed image to be displayed on the display section, wherein the image transformation section includes at least one buffer memory for temporarily storing the image data and the display data, an arithmetic/logic circuit for performing coordinate transformation when the image data is transformed into the display data, a lookup table of a trigonometric function for use in the arithmetic/logic circuit, and a CPU for controlling the at least one buffer memory, the arithmetic/logic circuit, and the lookup table.

In one embodiment of the present invention, the image transformation section includes any of a function for transforming the image data into the display data for generating a panoramic image, a function for transforming the image data into the display data for generating a perspective image, a function for determining a transformation region of the image data, a zoom-in/zoom-out function, and a pan/tilt function.

In another embodiment of the present invention, the image transformation section transforms the image data which has undergone zoom-in/zoom-out processing by the zoom-in/zoom-out function or pan/tilt processing by the pan/tilt function into the display data for generating a panoramic image or the display data for generating a perspective image.

In still another embodiment of the present invention, the arithmetic/logic circuit is formed only by linear operation circuits.

In still another embodiment of the present invention, the optical system includes a hyperboloidal mirror having a hyperboloidal shape of one sheet of a two-sheeted hyperboloid; a rotation axis of the hyperboloidal mirror is identical with an optical axis of an imaging lens included in the imaging section; and a first principal point of the imaging lens is located at a focal point of the hyperboloidal mirror.

In still another embodiment of the present invention, the optical system includes a plurality of mirrors each having a shape of a surface of revolution, the plurality of mirrors including first and second mirrors; and the optical system is structured such that the rotation axis of the plurality of mirrors is identical with an optical axis of an imaging lens included in the imaging section, a first principal point of the imaging lens is located at a focal point of the second mirror, and light which travels toward a focal point of the first mirror is reflected by the first mirror and, thereafter, reflected by the second mirror so as to reach the first principal point of the imaging lens included in the imaging section.

In still another embodiment of the present invention, the imaging section is a digital imaging section for transforming the image into digital image data.

In still another embodiment of the present invention, the omniazimuthal visual system further includes an image recording section for recording an output from the imaging section, wherein the image recording section is a digital recording section.

In still another embodiment of the present invention, the CPU includes a parallel operation function for controlling the display control section, the image transformation section and the display section.

In the present specification, the phrase "an optical system is capable of central projection transformation" means that an imaging device is capable of acquiring an image which corresponds to an image seen from one of a plurality of focal points of an optical system.

Hereinafter, functions of the present invention will be described.

An omniazimuthal visual system according to the present invention includes an image transformation section having a function for transforming image data output from an imaging section into a panoramic image or a perspective image, a function for determining a transformation region, a zoom-in/zoom-out function, a pan/tilt function, etc. The image transformation section includes an input buffer memory for storing image data, an arithmetic/logic circuit for image transformation processing, a central processing unit (CPU) for controlling the image transformation processing, a lookup table, and an output buffer memory for storing image data which has undergone the image transformation processing. Furthermore, the omniazimuthal visual system may include an image recording section.

With the above structure, since the image transformation section of the present invention is formed by hardware, it is not necessary to store intermediate results of the operations in a storage device and to read these intermediate results therefrom. Further, it is possible to carry out the image transformation processing within a delay time between an input and output of the hardware for operations (e.g., the image transformation section). Thus, the processing speed for image transformation processing is faster than that of a conventional system which carries out image transformation using software. Furthermore, since the image transformation section is realized by hardware (i.e., it does not include an additional element for software processing), the size of the entire omniazimuthal visual system can be reduced.

In general, a calculation for a trigonometric function is carried out by a series expanding method and an approximate calculation. The accuracy of the calculation is determined according to the number of orders of terms to be calculated. Accordingly, when a highly accurate calculation is required, the number of terms to be calculated is increased. As a result, the calculation time considerably increases. According to the present invention, a lookup table of a trigonometric function is employed, whereby the calculation time can be shortened.

When the zoom-in/zoom-out processing or the pan/tilt processing is carried out based on image data which is coordinate-transformed for panoramic or perspective transformation, it is necessary to provide a buffer memory for temporarily storing the coordinate-transformed image data. According to the present invention, the zoom-in/zoom-out processing or the pan/tilt processing is carried out based on input image data from an imaging section or an image recording section and, thereafter, the panoramic or perspective transformation is carried out. With such an arrangement, it is not necessary to provide an additional buffer memory.

According to a first aspect of the present invention (embodiment 1), the optical system is formed by a hyperboloidal mirror which has a shape of one sheet of a two-sheeted hyperboloid. The rotation axis of the hyperboloidal mirror is identical with the optical axis of an imaging lens included in the imaging section, and the first principal point of the imaging lens is located at one of focal points (external focal point) of the hyperboloidal mirror. In such a structure, an image obtained by the imaging section corresponds to an image seen from one of the focal points (internal focal point) of the hyperboloidal mirror. Therefore, in the panoramic or perspective transformation, it is possible to carry out coordinate transformation from a polar coordinate to a rectangular coordinate only with linear operations using the lookup table of a trigonometric function.

According to a second aspect of the present invention (embodiment 2), the optical system includes a plurality of convex mirrors having a shape of a surface of revolution. For example, the optical system includes two (first and second) convex mirrors having a shape of a surface of revolution. The rotation axes of the mirrors are identical with the optical axis of an imaging lens included in the imaging section. The imaging section is positioned such that a first principal point of the imaging lens is located at a focal point of the second mirror. With such a configuration, light which travels toward a focal point of the first mirror is reflected by the first mirror, and light reflected by the first mirror is further reflected by an internal face of the second mirror so as to reach the first principal point of the imaging lens. In the optical system having such a structure, an image obtained by the imaging section corresponds to an image seen from a focal point of the first mirror. Therefore, in the panoramic or perspective transformation, it is possible to carry out coordinate transformation from a polar coordinate to a rectangular coordinate only with linear operations using the lookup table of a trigonometric function.

When a digital imaging section which digitally converts an optical image into digital image data is used as the imaging section, data processing can be easily carried out.

When a digital recording section is used as the image recording section, data processing can be easily carried out.

Furthermore, when a CPU including a parallel operation function for controlling a display control section, an image transformation section and the display section, is used, the image transformation processing can be carried out at a high speed.

Thus, the invention described herein makes possible the advantage of providing an omniazimuthal visual system capable of processing a dynamic image with increased number of pixels by means of a high-speed image transformation.

This and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the drawings.
(Embodiment 1)

Figure 1:
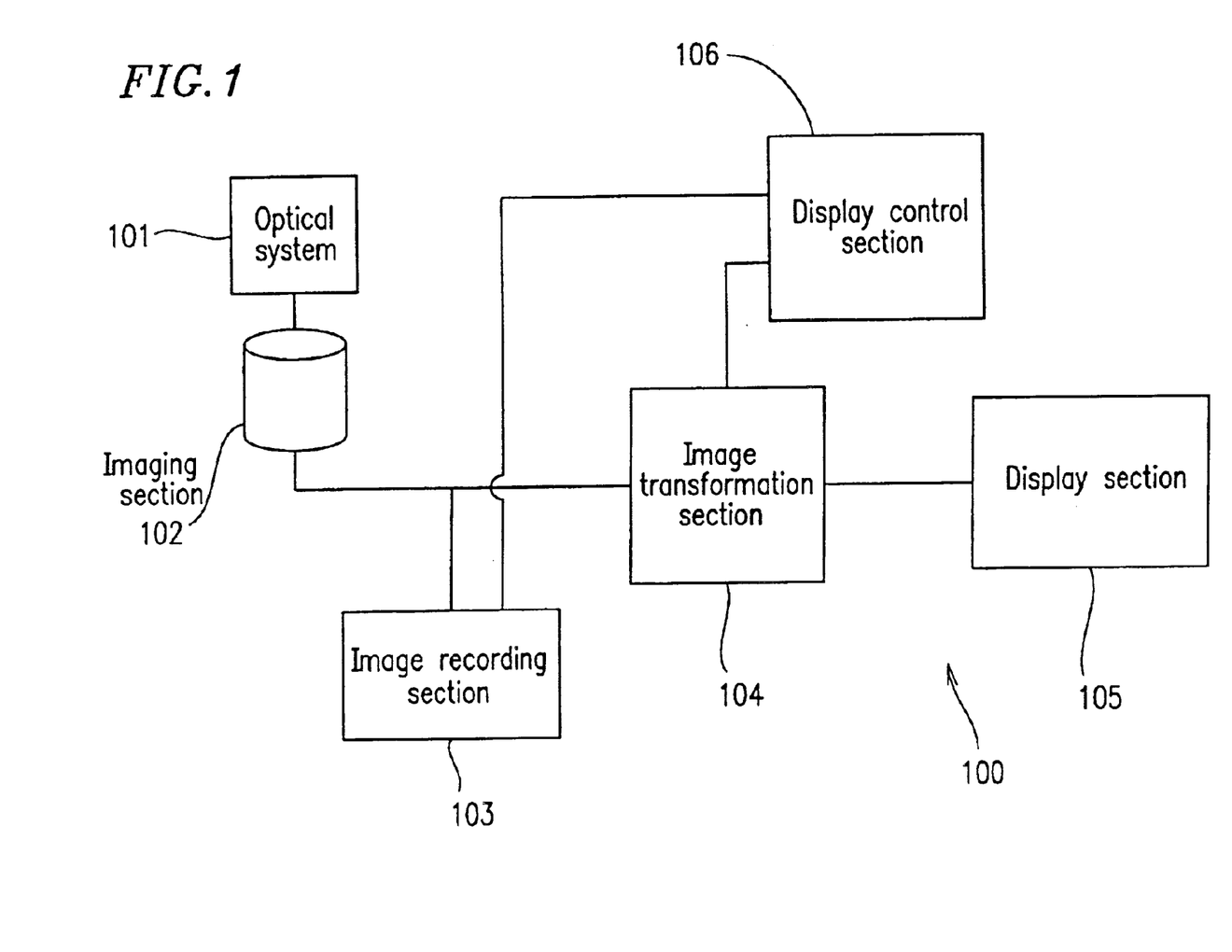
FIG. 1 is a block diagram showing a structure of an omniazimuthal visual system 100 according to embodiment 1 of the present invention.

FIG. 1 is a block diagram showing a structure of an omniazimuthal visual system 100 according to embodiment 1 of the present invention. The omniazimuthal visual system 100 includes: an optical system 101 capable of obtaining an image of 360° view field area therearound and capable of central projection transformation for the image: an imaging section 102 for converting an optical image obtained by the optical system 101 into image data: an image recording section 103 for recording the image data received from the imaging section 102; an image transformation section 104 for transforming the image data received from the imaging section 102 or the image recording section 103 into a panoramic image or a perspective image; a display section 105 for displaying an output of the image transformation section 104; and a display control section 106 for selecting an image to be displayed in the display section 105 and controlling the size of the image, etc.

Each of these components is now described in detail with reference to FIGS. 1 through 8.

Figure 2:
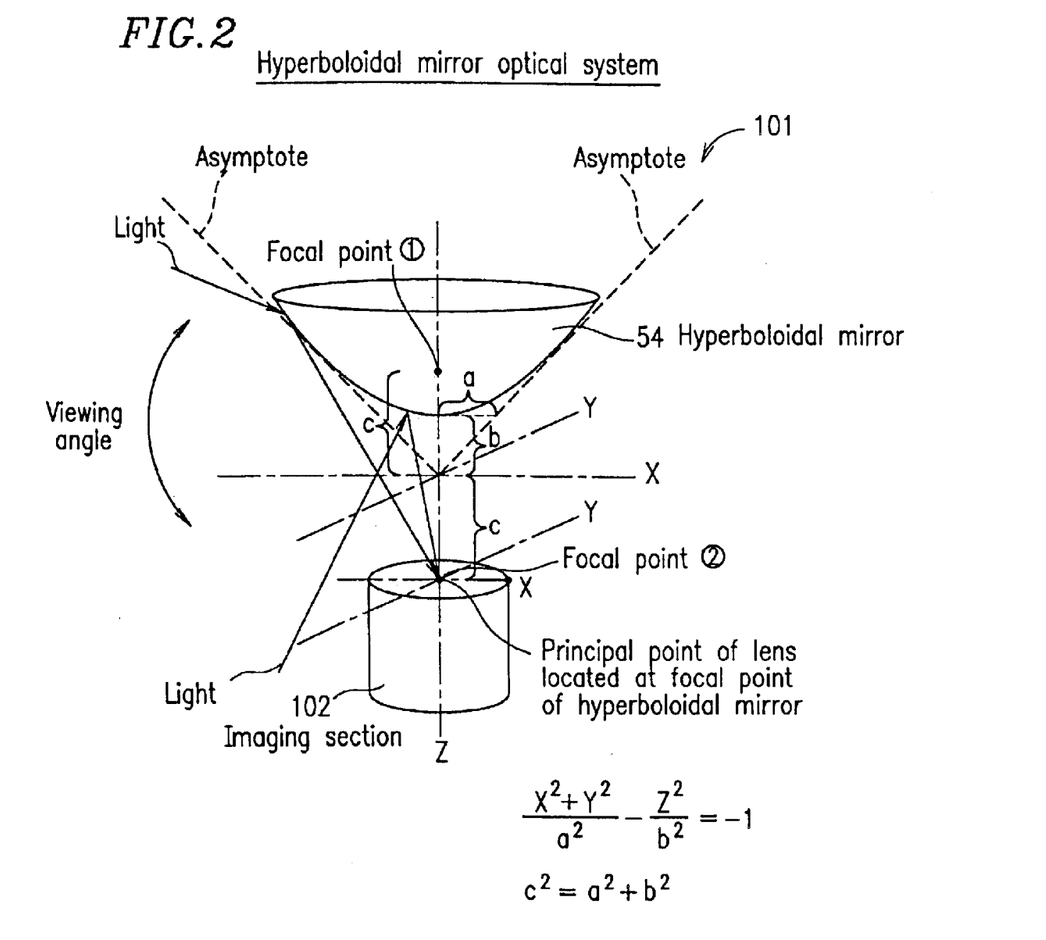
FIG. 2 shows a configuration example of an optical system according to embodiment 1.

FIG. 2 shows an example of the optical system 101 capable of central projection transformation. This optical system uses a hyperboloidal mirror 54 which has a shape of one sheet of a two-sheeted hyperboloid, which is an example of a mirror having a shape of a surface of revolution. The rotation axis of the hyperboloidal mirror 54 is identical with the optical axis of an imaging lens included in the imaging section 102, and the first principal point of the imaging lens which is included in the imaging section 102 is located at one of focal points of the hyperboloidal mirror 54 (external focal point ②). In such a structure, an image obtained by the imaging section 102 corresponds to an image seen from the internal focal point ① of the hyperboloidal mirror 54. Such an optical system is disclosed in, for example, Japanese Laid-Open Publication No. 6-295333, and only several features of the optical system are herein described.

In FIG. 2, the hyperboloidal mirror 54 is formed by providing a mirror on a convex surface of a body defined by one of curved surfaces obtained by rotating hyperbolic curves around a z-axis (two-sheeted hyperboloid), i.e., a region of the two-sheeted hyperboloid where Z>0. This two-sheeted hyperboloid is represented as:

$$(X^2+Y^2)/a^2 - Z^2/b^2 = -1$$

$$c^2 = (a^2+b^2)$$

where a and b are constants for defining a shape of the hyperboloid, and c is a constant for defining a focal point of the hyperboloid. Hereinafter, the constants a, b, and c are generically referred to as "mirror constants".

The hyperboloidal mirror 54 has two focal points ① and ②. All of light from outside which travels toward focal point ① is reflected by the hyperboloidal mirror 54 so as to reach focal point ②. The hyperboloidal mirror 54 and the imaging section 102 are positioned such that the rotation axis of the hyperboloidal mirror 54 is identical with the optical axis of an imaging lens of the imaging section 102, and the first principal point of the imaging lens is located at focal point ②. With such a configuration, an image obtained by the imaging section 102 corresponds to an image seen from focal point ① of the hyperboloidal mirror 54.

Due to such an optical system, when a lookup table (LUT) 110 (described later) is used, the image transformation section 104 (FIG. 1) can carry out an image transformation, i.e., the image transformation section 104 can transform image data into display data, such as a panoramic image, a perspective image, etc., only with linear operations and without nonlinear operations.

The imaging section 102 may be a video camera or the like. The imaging section 102 converts an optical image obtained through the hyperboloidal mirror 54 of FIG. 2 into digital image data using a solid-state imaging device, such as CCD, CMOS, etc. A lens of the imaging section 102 may be a commonly-employed spherical lens or aspherical lens so long as the first principal point of the lens is located at focal point ②.

The image recording section 103 receives a digital output of the imaging section 102 and digitally records the digital output (time-series image signal) in a tape or a disk-type recording medium such as an MO, an MD, a DVD, etc.

Figure 3:
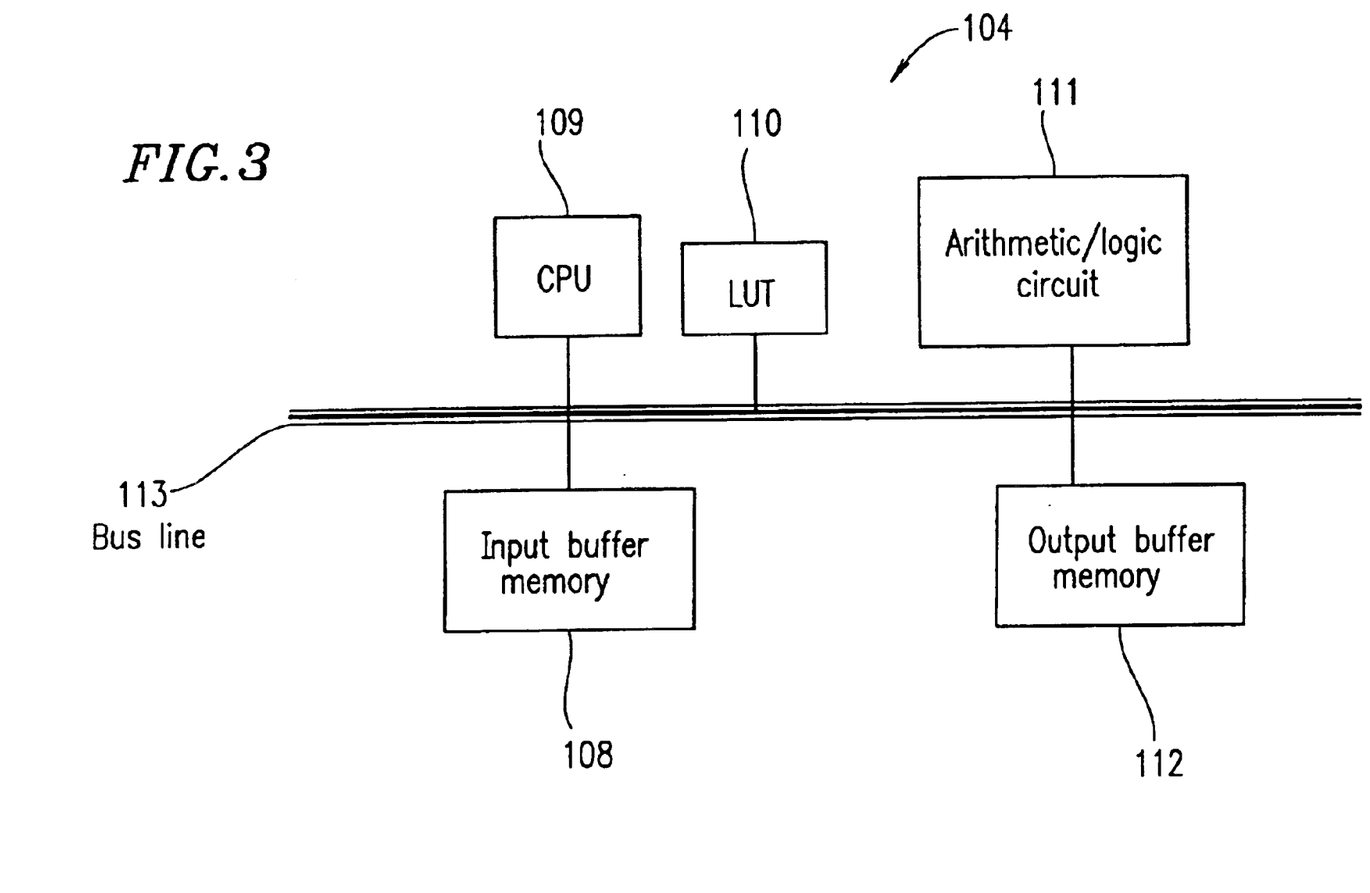
FIG. 3 is a block diagram showing a configuration example of an image transformation section according to embodiment 1.

Referring to FIG. 3, the image transformation section 104 includes an input buffer memory 108, a CPU 109, a lookup table (LUT) 110 of a trigonometric function, an arithmetic/logic circuit 111 for image transformation, and an output buffer memory 112. These components are connected via a bus line 113. In FIG. 3, two buffer memories, i.e., the input buffer memory 108 and the output buffer memory 112 are shown. However, according to the present invention, it is only necessary to provide at least one buffer memory.

The input buffer memory 108 of the image transformation section 104 receives image data from the imaging section 102 and the image recording section 103. The image data input to the input buffer memory 108 is a round-shape image. This round-shape image is transferred to the arithmetic/logic circuit 111 and subjected to a coordinate transformation from a polar coordinate to a rectangular coordinate using the lookup table (LUT) 110 of a trigonometric function, whereby the round-shape image is transformed into an image which is easier for a human to see, such as a square panoramic image or a perspective image. The coordinate transformation will be described later in detail. Furthermore, the image data may be, if necessary, subjected to various image transformation processing such as zoom-in/zoom-out, pan/tilt, etc., according to alteration of the viewing direction. After the image transformation processing, the processed image data is input to the output buffer memory 112. A series of steps of the image transformation processing are controlled by the CPU 109.

When image data which has undergone the coordinate transformation is subjected to zoom-in/zoom-out processing or pan/tilt processing, it is necessary to provide a buffer memory for temporarily storing the image data which has undergone the coordinate transformation. Therefore, in embodiment 1, image data from the imaging section 102 or the image recording section 103, which has not undergone the coordinate transformation, is used for zoom-in/zoom-out processing or pan/tilt processing, and image data obtained after the zoom-in/zoom-out processing or pan/tilt processing is transformed into a panoramic image or a perspective image. With such a procedure, the image transformation can be carried out without providing an additional buffer memory and, accordingly, an increase in size of the system can be prevented.

The display section 105 may be a monitor, or the like, of a cathode-ray tube, LCD, EL (electroluminescence device), etc. The display section 105 receives an output from the output buffer memory 112 of the image transformation section 104 and displays an image.

The display control section 106 may be a special-purpose microcomputer or the like. The display control section 106 selects the type of an image to be displayed on the display section 105 (for example, a panoramic image, a perspective image, etc., obtained by the image transformation in the image transformation section 104), and controls the orientation and the size of the image.

A principle of the image transformation by the arithmetic/logic circuit 111 is now described. The image transformation includes a panoramic transformation for obtaining a panoramic (360°) image and a perspective transformation for obtaining a perspective image. Furthermore, the perspective transformation includes a horizontally rotational transfer (horizontal transfer, so-called "pan movement") and a vertically rotational transfer (vertical transfer, so-called "tilt movement").

Figure 4:
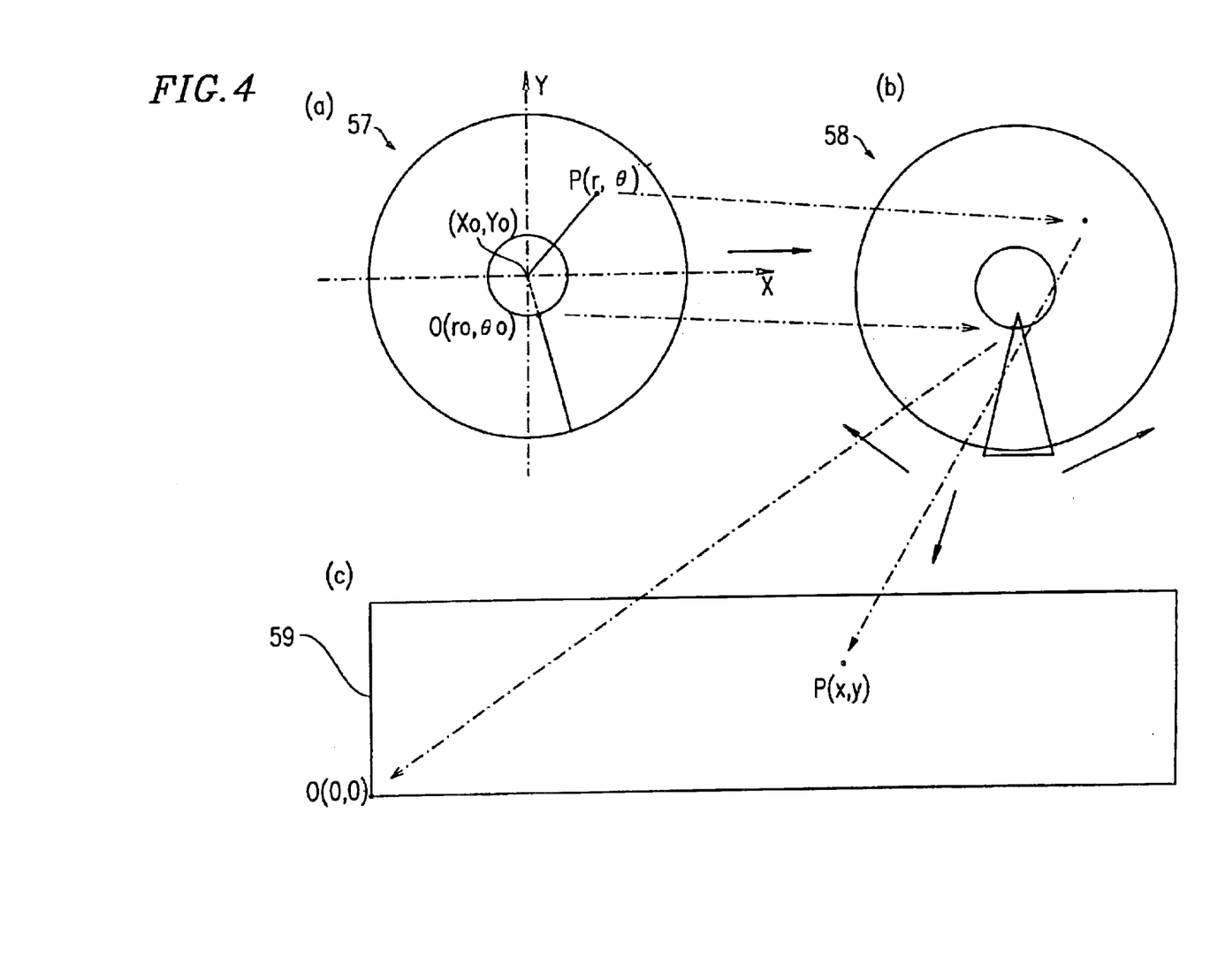
FIG. 4 illustrates an example of panoramic (360°) image transformation according to embodiment 1. Part (a) shows an input round-shape image. Part (b) shows a donut-shape image subjected to the panoramic image transformation. Part (a) shows a panoramic image obtained by transformation into a rectangular coordinate.

First, a panoramic (360°) image transformation is described with reference to FIG. 4. Referring to part (a) of FIG. 4, an image 57 is a round-shape image input from the imaging section 102 or the image recording section 103 to the arithmetic/logic circuit 111 (FIG. 1). Part (b) of FIG. 4 shows a donut-shape image 58 subjected to the panoramic image transformation. Part (o) of FIG. 4 shows a panoramic image 59 obtained by transforming the image 57 into a rectangular coordinate.

Part (a) of FIG. 4 shows the input round-shape image 57 which is formatted in a polar coordinate form in which the center point of the image 57 is positioned at the origin (Xo,Yo) of the coordinates. In this polar coordinate, a pixel P in the image 57 is represented as $P(r,\theta)$. Referring to part (o) of FIG. 4, in the panoramic image 59, a point corresponding to the pixel P in the image 57 (part (a) of FIG. 4) can be represented as $P(x,y)$. When the round-shape image 57 shown in part (a) of FIG. 4 is transformed into the square panoramic image 59 shown in part (o) of FIG. 4 using a point $O(ro,\theta o)$ as a reference point, this transformation is represented by the following expressions:

$$x=\theta-\theta o$$

$$y=r-ro$$

When the input round-shape image 57 (part (a) of FIG. 4) is formatted into a rectangular coordinate such that the center point of the round-shape image 57 is positioned at the origin of the rectangular coordinate system, (Xo,Yo), the point P on the image 57 is represented as (X,Y). Accordingly, X and Y are represented as:

$$X=Xo+r\times\cos\theta$$

$$Y=Yo+r\times\sin\theta$$

Thus, $$\theta=arctan\{(Y-Yo)/(X-Xo)\}-\theta o$$

$$r=sqrt\{(X-Xo)^2+(Y-Yo)^2\}$$

In the pan movement for a panoramic image, a point obtained by increasing or decreasing "$\theta o$" of the reference point $O(ro,\theta o)$ by a certain angle $\Delta\theta$ according to a predetermined key operation is used as a reference point for the pan movement. With this reference point for the pan movement, a horizontally panned panoramic image can be directly obtained from the input round-shape image 57. It should be noted that a tilt movement is not performed for a panoramic image.

Next, a perspective transformation is described with reference to FIG. 5. In the perspective transformation, the position of a point on the input image obtained by a light receiving section 2a of the imaging section 102 which corresponds to a point in a three-dimensional space is calculated, and image information at the point on the input image is allocated to a corresponding point on a perspective-transformed image, whereby coordinate transformation is performed.

Figure 5:
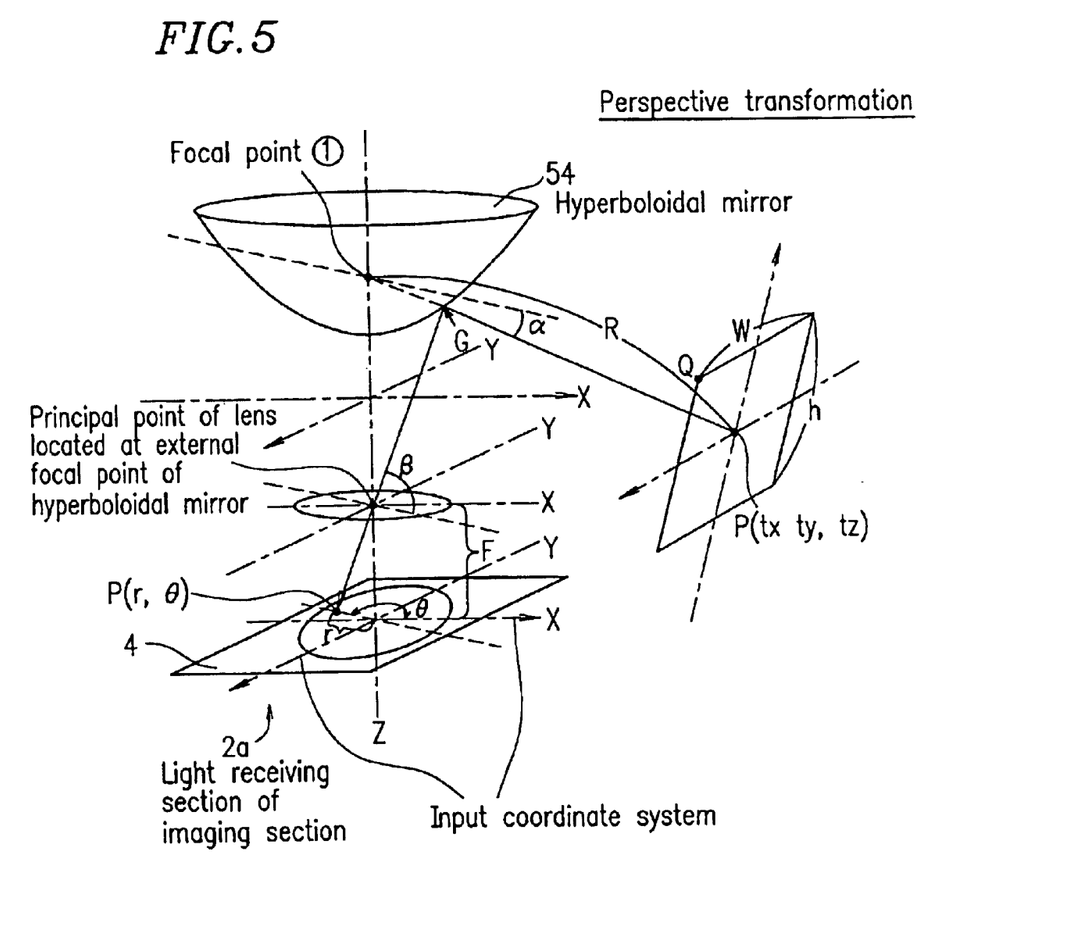
FIG. 5 illustrates a perspective transformation according to embodiment 1.

In particular, as shown in FIG. 5, a point in a three-dimensional space is represented as $P(tx,ty,tz)$, a point corresponding thereto which is on a round-shape image (input coordinate system) formed on an imaging lens (light receiving section) 2a of the imaging section 102 is represented as $P(r,\theta)$, the focal distance of the imaging lens 2a of the imaging section 102 is F, and mirror constants are (a, b, c), which are the same as a, b, and c in FIG. 2. With these parameters, expression (1) is obtained:

$$r=F\times\tan((\pi/2)-\beta) \qquad (1)$$

In FIG. 5, $\alpha$ is an incident angle of light which travels from an object point (point P) toward focal point ① (with respect to a horizontal plane including focal point ①; β is an incident angle of light which comes from point P, is reflected at point G on the hyperboloidal mirror 54, and enters into the imaging section 102 (angle between the incident light and a plane perpendicular to an optical axis of the imaging lens 2a of the imaging section 102). Algebraic numbers α, β, and θ are represented as follows:

$$\beta = arctan(((b^2+c^2) \times \sin \alpha - 2 \times b \times c)/(b^2-c^2) \times \cos \alpha)$$

$$\alpha = arctan(tz/sqrt(tx^2+ty^2))$$

$$\theta = arctan(ty/tx)$$

From the above, expression (1) is represented as follows:

$$r = F \times (((b^2-c^2) \times sqrt(tx^2+ty^2))/((b^2+c^2) \times tz - 2 \times b \times c \times sqrt(tx^2+ty^2+tz^2)))$$

The coordinate of a point on the round-shape image is transformed into a rectangular coordinate P (X,Y). X and Y are represented as:

$$X = r \times \cos \theta$$

$$Y = r \times \sin \theta$$

Accordingly, from the above expressions:

$$X = F \times (((b^2-c^2) \times tx/((b^2+c^2) \times tz - 2 \times b \times c \times sqrt(tx^2+ty^2+tz^2))) \quad (2)$$

$$Y = F \times (((b^2-c^2) \times ty/((b^2+c^2) \times tz - 2 \times b \times c \times sqrt(tx^2+ty^2+tz^2))) \quad (3)$$

With the above expressions, object point P (tx,ty,tz) is perspectively transformed onto the rectangular coordinate system.

Now, referring to FIG. 5, consider a square image plane having width W and height h and located in the three-dimensional space at a position corresponding to a rotation angle θ around the Z-axis where R is a distance between the plane and focal point ① of the hyperboloidal mirror 54, and φ is a depression angle (which is equal to the incident angle α). Parameters of a point at the upper left corner of the square image plane, point Q (txq,tyq,tzq), are represented as follows:

$$txq = (R\cos\phi + (h/2)\sin \phi)\cos \theta - (W/2)\sin \theta \quad (4)$$

$$tyq = (R\cos\phi + (h/2)\sin \phi)\sin \theta + (W/2)\cos \theta \quad (5)$$

$$tzq = R\sin\phi - (h/2)\cos \theta \quad (6)$$

By combining expressions (4), (5), and (6) into expressions (2) and (3), it is possible to obtain the coordinate (X,Y) of a point on the round-shape image formed on the imaging lens 2a of the imaging section 102 which corresponds to point Q of the square image plane. Furthermore, assume that the square image plane is transformed into a perspective image divided into pixels each having a width d and a height e. In expressions (4), (5), and (6), the parameter W is changed in a range from W to −W on the units of W/d, and the parameter h is changed in a range from h to −h on the units of h/e, whereby coordinates of points on the square image plane are obtained. According to these obtained coordinates of the points on the square image plane, image data at points on the round-shape image formed on the imaging lens 2a which correspond to the points on the square image plane is transferred onto a perspective image.

Next, a horizontally rotational movement (pan movement) and a vertically rotational movement (tilt movement) in the perspective transformation are described. First, a case where point P as mentioned above is horizontally and rotationally moved (pan movement) is described. A coordinate of a point obtained after the horizontally rotational movement, point P' (tx',ty',tz'), is represented as follows:

$$tx' = (R\cos\phi + (h/2)\sin \phi)\cos(\theta + \Delta\theta) - (W/2)\sin(\theta + \Delta\theta) \quad (7)$$

$$ty' = (R\cos\phi + (h/2)\sin \phi)\sin(\theta + \Delta\theta) + (W/2)\cos(\theta + \Delta\theta) \quad (8)$$

$$tz' = R\sin\phi - (h/2)\cos \phi \quad (9)$$

where Δθ is the movement angle.

By combining expressions (7), (8), and (9) into expressions (2) and (3), the coordinate (X,Y) of a point on the round-shape image formed on the imaging lens 2a which corresponds to the point P' (tx',ty',tz') can be obtained. This applies to other points on the round-shape image. In expressions (7), (8), and (9), the parameter W is changed in a range from W to −W on the units of W/d, and the parameter h is changed in a range from h to −h on the units of h/e, whereby coordinates of points the square image plane are obtained. According to these obtained coordinates of the points on the square image plane, image data at points on the round-shape image formed on the imaging lens 2a which correspond to the point P' (tx',ty', tz') is transferred onto a perspective image, whereby a horizontally rotated image can be obtained.

Next, a case where point P as mentioned above is vertically and rotationally moved (tilt movement) is described. A coordinate of a point obtained after the vertically rotational movement, point P" (tx",ty",tz"), is represented as follows:

$$tx'' = (R\cos(\phi + \Delta\phi) + (h/2)\sin(\phi + \Delta\phi)) \times \cos\theta - (W/2)\sin \theta \quad (10)$$

$$ty'' (R\cos(\phi + \Delta\phi) + (h/2)\sin(\phi + \Delta\phi)) \times \sin \theta + (W/2)\cos \theta \quad (11)$$

$$tz'' = R\sin(\phi + \Delta\phi) - (h/2)\cos(\phi + \Delta\phi) \quad (12)$$

where Δφ denotes a moving angle.

By combining expressions (10), (11), and (12) into expressions (2) and (3), the coordinate (X,Y) of a point on the round-shape image formed on the imaging lens 2a which corresponds to the point P" (tx",ty",tz") be obtained. This applies to other points on the round-shape image. In expressions (10), (11), and (12), the parameter W is changed in a range from W to −W on the units of W/d, and the parameter h is changed in a range from h to −h on the units of h/e, whereby coordinates of points on the square image plane are obtained. According to these obtained coordinates of the points on the square image plane, image data at points on the round-shape image formed on the imaging lens 2a which correspond to the point P" (tx",ty",tz") is transferred onto a perspective image, whereby a vertically rotated image can be obtained.

Further, a zoom-in/zoom-out function for a perspective image is achieved by one parameter, the parameter R. In particular, the parameter R in expressions (4) through (12) is changed by a certain amount ΔR according to a certain key operation, whereby a zoomed-in/out image is generated directly from the round-shape input image formed on the imaging lens 2a.

Furthermore, a transformation region determination function is achieved such that the range of a transformation region in a radius direction of the round-shape input image formed on the imaging lens 2a is determined by a certain key operation during the transformation from the round-shape input image into a panoramic image. When the imaging section is in a transformation region determination mode, a transformation region can be determined by a certain key operation. In particular, a transformation region in the round-shape input image is defined by two circles, i.e., as shown in part (a) of FIG. 4, an inner circle including the reference point O(ro, θo) whose radius is and an outer circle which corresponds to an upper side of the panoramic image 59 shown in part (a) of FIG. 4. The maximum radius of the round-shape input image formed on the imaging lens 2a is rmax, and the minimum radius of an image of the imaging lens 2a which is formed on the imaging lens 2a is rmin. The radiuses of the above two circles which define the transformation region can be freely determined within the range from rmin to rmax by a certain key operation.

Further still, the size of the perspective image (perspective transformation region) may be freely determined by changing the parameters W and h in the above expressions for the perspective transformation.

Next, a circuit configuration of a principal portion of the arithmetic/logic circuit 111 is described with reference to FIGS. 6 through 8. The arithmetic/logic circuit 111 includes at least one of a circuit for panoramic transformation (see FIG. 6) and a circuit for perspective transformation (see FIGS. 7 and 8).

Figure 6:
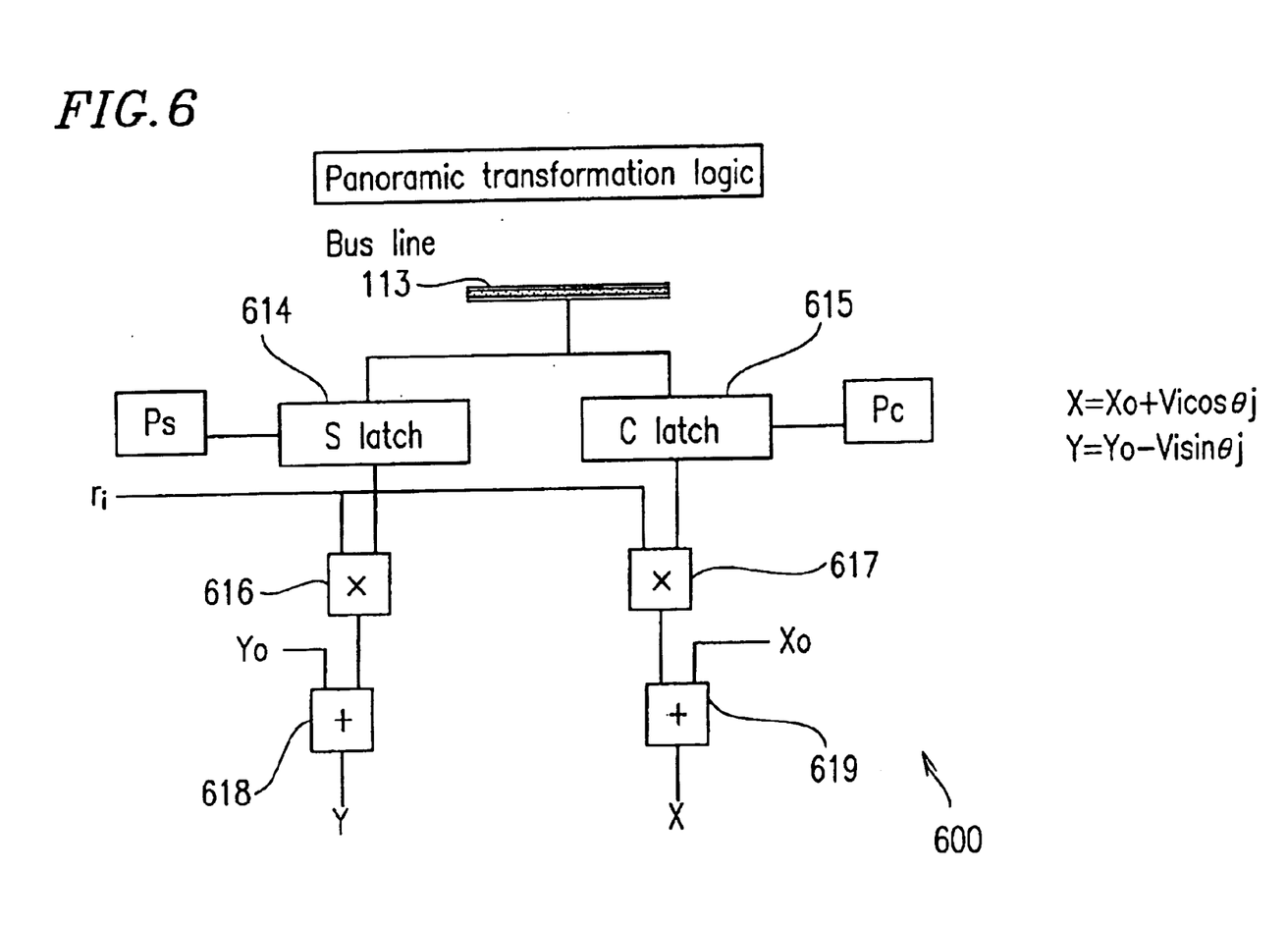
FIG. 6 shows a configuration example of a panoramic transformation logic circuit according to embodiment 1.

FIG. 6 shows an arithmetic/logic circuit 600 for panoramic transformation. The arithmetic/logic circuit 600 includes two latch circuits 614 and 615, two multipliers 616 and 617, an adder 619, and a adder 618. Input terminals of the two latch circuits 614 and 615 are connected to a bus line 113. In response to control signals Ps and Pc, the two latch circuits 614 and 615 respectively obtain values of $\sin\theta_j$ and $\cos\theta_j$ through the bus line 113 from the lookup table (LUT) 110 of a trigonometric function (FIG. 3), and respectively hold these values. That is, the latch circuit (S-latch circuit) 614 holds the value of $\sin\theta_j$, and the latch circuit (C-latch circuit) 615 holds the value of $\cos\theta_j$. Outputs of the latch circuits 614 and 615 are multiplied by $r_i$ by the multipliers 616 and 617, respectively. An output of the multiplier 617, ($r_i \times \cos\theta_j$)), is added to Xo the adder 619, and the adder 619 outputs ($X = Xo + r_i\cos\theta_j$) as X-coordinate data of a point on an input image. An output of the multiplier 616, ($r_i \times \sin\theta_j$), is added to Yo by the adder 618, and the adder 618 outputs ($Y = Yo + r_i\sin\theta_j$) as Y-coordinate data of the point on an input image. These X-coordinate data and Y-coordinate data are transmitted through the bus line 113 to the output buffer memory 112 under the control of the CPU 109 (FIG. 3). Thus, in the image transformation section 104, under the control of the CPU 109 via the bus line 113, X- and Y-coordinate data is calculated based on image data stored in the input buffer memory 108, and the calculated X- and Y-coordinate data is stored at a corresponding coordinate position held in the output buffer memory 112.

Next, an arithmetic/logic circuit for perspective transformation is described with reference to FIGS. 7 and 8. The arithmetic/logic circuit for perspective transformation is formed by a first step of the arithmetic/logic circuit for perspective transformation (perspective transformation logic 1 of FIG. 7) including four latch circuits 720–723, multipliers 724–727, 730–735, and 738, adders 729 736, and subtracters 728 and 737 and a second step of the arithmetic/logic circuit for perspective transformation (perspective transformation logic 2 of FIG. 8) including multipliers 741–747, and 751, adders 740, 748, and 749, subtracters 739 and 752, a square rooter 750, and an inverter 753.

Figure 7:
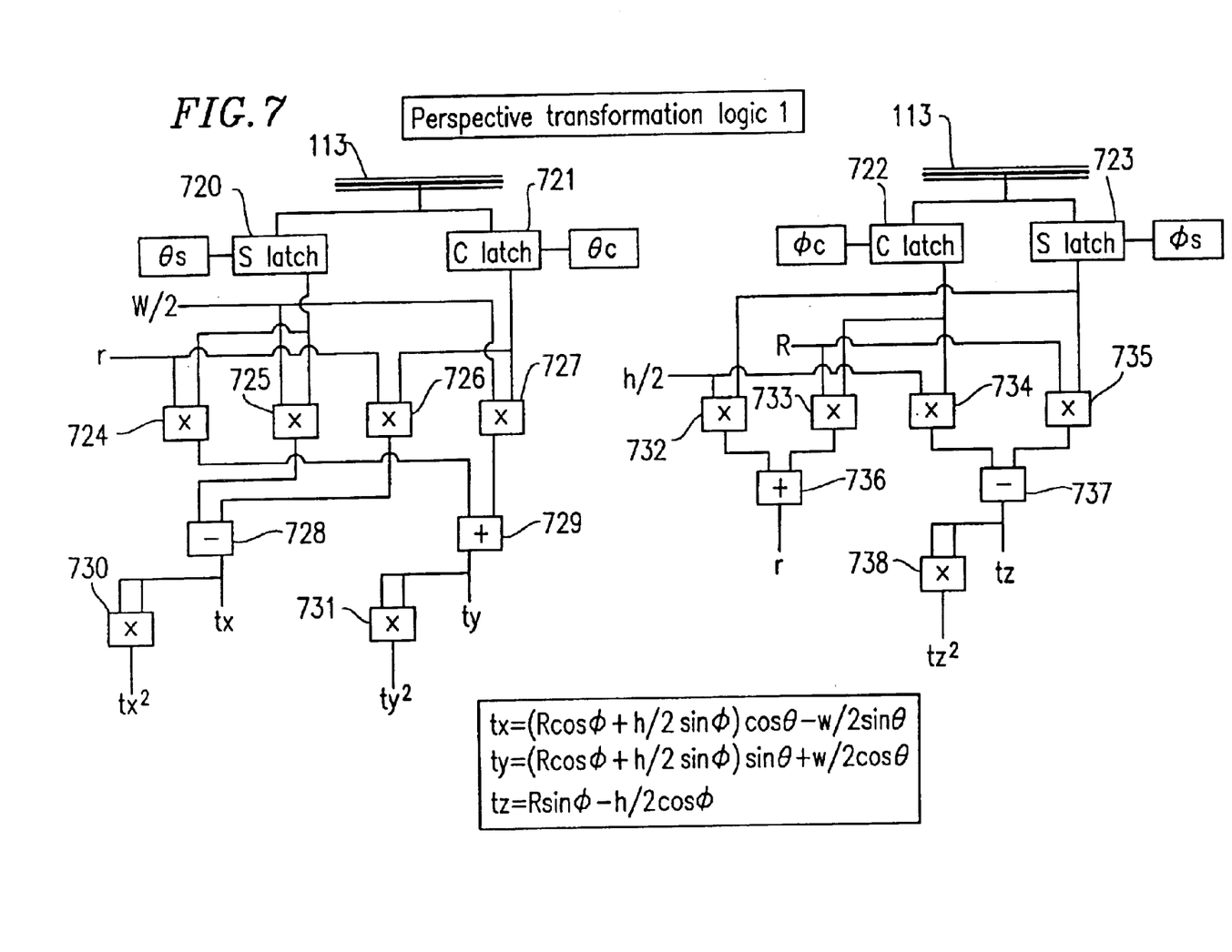
FIG. 7 shows a configuration example of a perspective transformation logic circuit according to embodiment 1.

In the perspective transformation logic 1 of FIG. 7, input terminals of the four latch circuits 720–723 are connected to a bus line 113. In 11 response to control signals θs, θc, φc, and φs, the latch circuits 720–723 respectively obtain values of sin θ, cos θ, cos φ, and sin φ through the bus line 113 from the lookup table (LUT) 110 of a trigonometric function (FIG. 3), and respectively hold these values. That is, the latch circuit 720 holds the value of sin θ, the latch circuit 721 holds the value of cos θ, the latch circuit 722 holds the value of cos φ, and the latch circuit 723 holds the value of sin φ.

An output of the latch circuit 722 is input to the multipliers 733 and 734. An output of the latch circuit 723 is input to the multipliers 732 and 735. Outputs of the latch circuits 722 and 723 are multiplied by R by the multipliers 733 and 735, respectively, and multiplied by h/2 by the multipliers 732 and 734, respectively. Outputs of the multipliers 732 and 733 are added by the adder 736. An output of the adder 736, r, is send to the multipliers 724 and 726. An output of the latch circuit 720 is input to the multipliers 724 and 725. An output of the latch circuit 721 is input to the multipliers 726 and 727. Outputs of the latch circuits 720 and 721 are multiplied by r by the multipliers 724 and 726, respectively, and multiplied by W/2 by the multipliers 725 and 727, respectively. A difference between outputs of the multipliers 725 and 726 is obtained by the subtracter 728 as tx, which is a x-coordinate of a point in a three-dimensional space:

$$tx = (R\cos\phi + (h/2)\sin\phi)\cos\theta - (W/2)\sin\theta$$

Outputs of the multipliers 724 and 727 are added by the adder 729, and a result of the addition is output as ty, which is a y-coordinate of the point in a three-dimensional space:

$$ty = (R\cos\theta + (h/2)\sin\phi)\sin\theta + (W/2)\cos\theta$$

The multipliers 730 and 731 generate $tx^2$ and $ty^2$ from tx and ty, respectively.

A difference between outputs of the multipliers 734 and 735 is obtained by the subtracter 737 as tz, which is a z-coordinate of a point in a three-dimensional space:

$$tz = R\sin\phi - (h/2)\cos\theta$$

The multiplier 738 generates $tz^2$ from tz.

Figure 8:
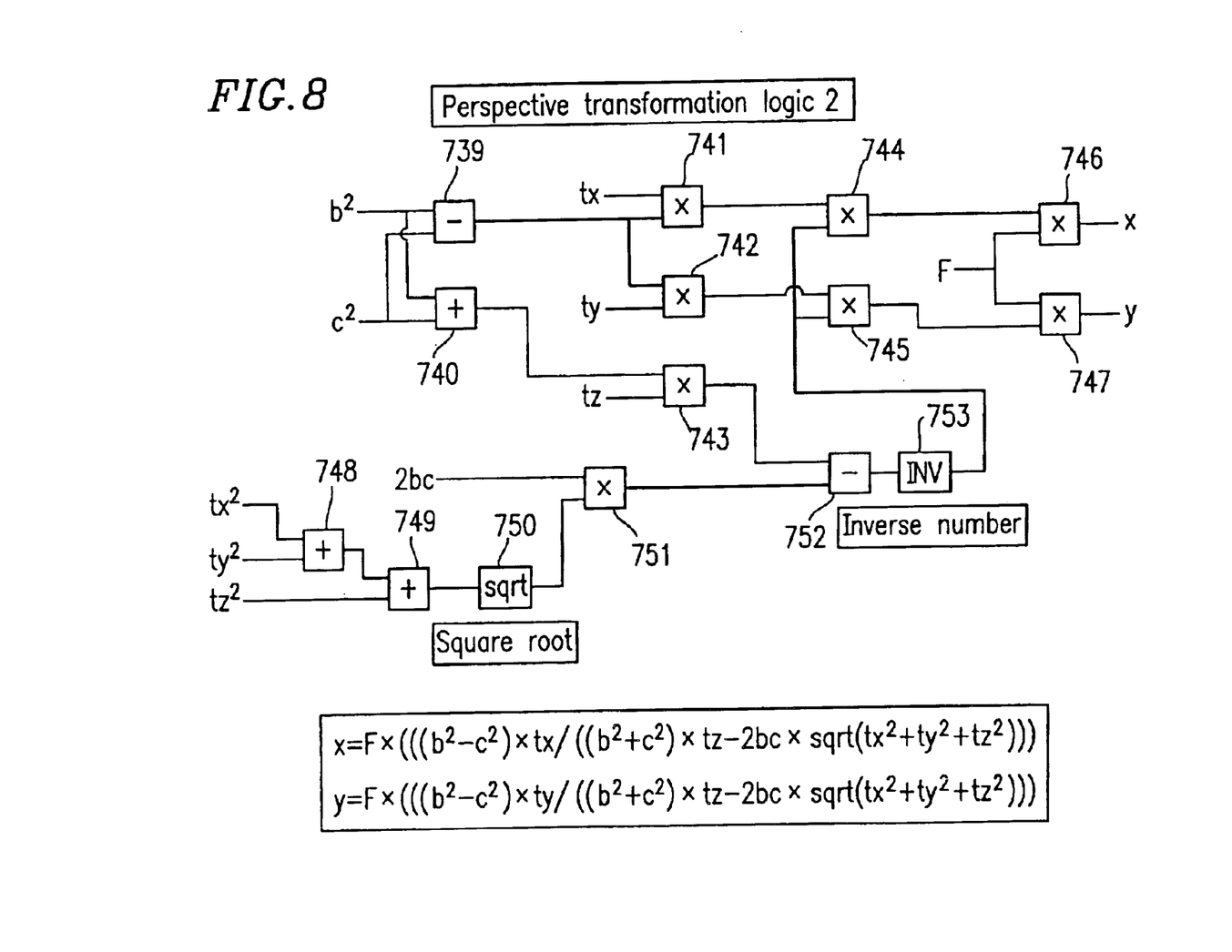
FIG. 8 shows a configuration example of a perspective transformation logic circuit according to embodiment 1.

In the perspective transformation logic 2 shown in FIG. 8, $tx^2$, $ty^2$, and $tz^2$ are added by the adders 748 and 749. A result of the addition, i.e., an output of the adder 749 is input to a square rooter 750 so as to obtain a square root:

$$sqrt(tx^2 + ty^2 + tz^2) = R(\text{constant})$$

An output of the square rooter 750 is multiplied by 2bc (constant) by the multiplier 751, and a result of the multiplication is output to the subtracter 752. In FIG. 8, a, b, and c are mirror constants.

The adder 740 calculates a sum of $b^2$ and $c^2$, and the subtracter 739 calculates a difference between $b^2$ and $c^2$ ($b^2 - c^2$). The multiplier 743 multiplies the sum of $b^2$ and $c^2$ by tz, and outputs a result of the multiplication to the subtracter 752. The subtracter 752 calculates a difference between the output of the multiplier 743 and the output of the multiplier 751. An output of the subtracter 752 is inverted by the inverter 753 into an inverse number, and this inverse number is transmitted to the multipliers 744 and 745.

The difference between $b^2$ and $c^2$ ($b^2 - c^2$) is multiplied by tx and ty by the multipliers 741 and 742, respectively. Outputs of the multipliers 741 and 742 are respectively transmitted to the multipliers 744 and 745 and multiplied by an output of the inverter 753. Furthermore, outputs of the multipliers 744 and 745 are transmitted to the multipliers 746 and 747, respectively, and further multiplied by a constant F. The constant F is a focal distance of the imaging lens 2a (FIG. 5). As a result, x- and y-coordinate data of a point on an input image are obtained as follows:

$=Fx(((b^2-c^2)\times tx/((b^2+c^2)\times tz-2\times b\times c\times sqrt(tx^2+ty^2+tz^2)))$ $y=Fx(((b^2-c^2)\times ty/((b^2+c^2)\times tz-2\times b\times c\times sqrt(tx^2+ty^2+tz^2)))$ The x- and y-coordinate data is transmitted through the bus line 113 to the output buffer memory 112 under the control of the CPU 109 (FIG. 3). Thus, in the image transformation section 104, under the control of the CPU 109 via the bus line 113, X- and Y-coordinate data is calculated based on image data stored in the input buffer memory 108, and the calculated X- and Y-coordinate data is stored at a corresponding coordinate position held in the output buffer memory 112.

As described above, according to the present invention, the pan/tilt function for the panoramic image, the zoom-in/zoom-out function for the perspective image, and the transformation region determination function for the panoramic and perspective images are achieved by changing parameters (constants). Therefore, it is not necessary to add a circuit for these special purposes.

As described above, all of the image transformations, e.g., the panoramic image transformation, the perspective transformation, and the horizontally rotational movement and the vertically rotational movement (pan/tilt movement), are carried out only with linear operations. This is because the imaging section 102 is capable of acquiring an image which corresponds to an image seen from the focal point ①of the hyperboloidal mirror 54 (the optical system 101 is capable of central projection transformation) and, accordingly, the transformation from a polar coordinate to a rectangular coordinate can be carried out only with linear operations using the lookup table (LUT) 110 of a trigonometric function. Furthermore, the zoom-in/zoom-out function can be achieved with linear operations.

In a conventional visual system, the above image data transformation is carried out using software. Accordingly, 20 or more steps are required in arithmetic processing for a single data transformation even in the case of using a hyperboloidal mirror. Therefore, the image transformation processing using the software requires a long processing time. Furthermore, it is further necessary to store intermediate results of the operations in a storage device and to read these intermediate results therefrom. On the other hand, according to embodiment 1 of the present invention, the operations are carried out by the image transformation section (hardware) 104 without using software. Thus, it is possible to carry out the image data transformation within a delay time between an input and output of the hardware for operations (e.g., the image transformation section 104). Therefore, the present invention can be applied to the transformation for dynamic images, to which the conventional visual system cannot be applied. Furthermore, with the CPU 109 capable of parallel processing, faster processing speed is achieved. Further still, since the image transformation section 104 is realized by hardware, the size of the entire omniazimuthal visual system can be reduced.

(Embodiment 2)

Figure 9:
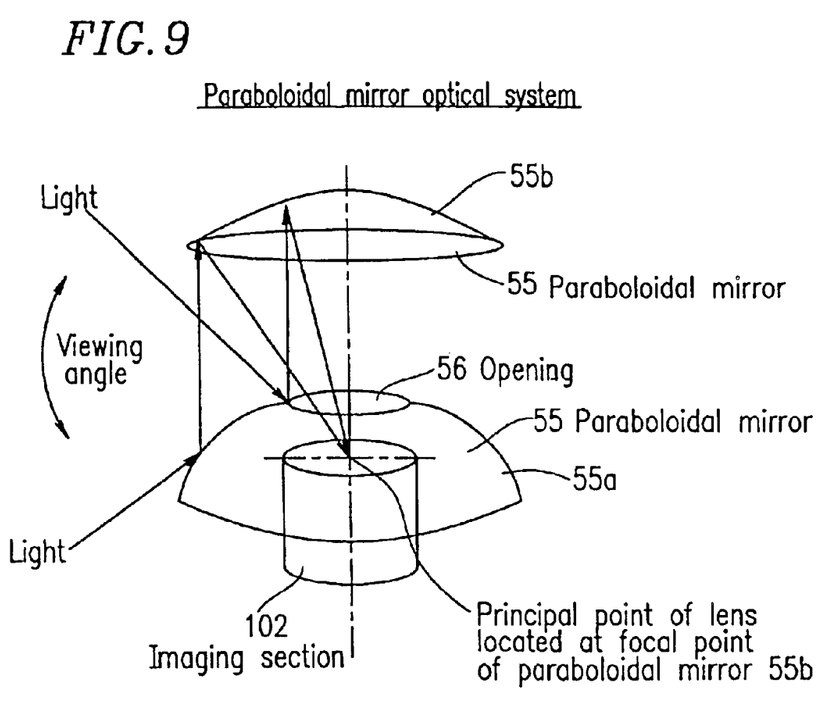
FIG. 9 shows a configuration example of an optical system according to embodiment 2.

Embodiment 2 uses an optical system including a plurality of convex mirrors having a shape of a surface of revolution. FIG. 9 shows an example of the optical system 101 capable of central projection transformation, including two convex mirrors having a shape of a surface of revolution.

An example shown in FIG. 9 uses first and second parboloidal mirrors 55a and 55b (a paraboloidal mirror is an example of a mirror having a shape of a surface of revolution). As shown in FIG. 9, the first and second paraboloidal mirrors 55a and 55b are positioned such that the rotation axes of the first and second paraboloidal mirrors 55a and 55b are identical with the optical axis of an imaging lens included in the imaging section 102. The first paraboloidal mirror 55a, which is the closer of the mirrors 55a and 55b to the imaging section 102, has an opening 56. The imaging section 102 is positioned such that the first principal point of the imaging lens is located at a focal point of the second paraboloidal mirror 55b. With such a configuration, light which travels toward a focal point of the first paraboloidal mirror 55a is reflected by the first paraboloidal mirror 55a, and the light reflected by the first paraboloidal mirror 55a is further reflected by an internal face of the second paraboloidal mirror 55b so as to reach the first principal point of the imaging lens. In the optical system having such a structure, an image obtained by the imaging section corresponds to an image seen from a focal point of the first paraboloidal mirror 55a.

Such an optical system is described in detail in Japanese Laid-Open Publication No. 11-331654. An omniazimuthal visual system including an image transformation system of the present invention can use this optical system.

As described hereinabove in detail, according to the present invention, an image transformation section is formed by hardware including an arithmetic/logic circuit. Therefore, the processing speed for image transformation is faster than that of a conventional system which carries out image transformation using software. Thus, the system of the present invention has sufficient performance which can provide a processing speed required for dynamic images even when the number of pixels to be processed is increased. Furthermore, since the image transformation section is realized by hardware, the size of the entire omniazimuthal visual system can be reduced.

Furthermore, according to the present invention, the zoom-in/zoom-out processing or the pan/tilt processing are carried out based on image data obtained by the imaging section, and then, image data corresponding to an image which has undergone such processing is transformed into a panoramic image or a perspective image. With such a processing procedure, the number of processing steps and the use of a buffer memory can be reduced and, accordingly, the processing speed can be further improved, and the size of the system can be further reduced. Further still, when a CPU having a parallel operation function is used, a still faster processing speed for image transformation can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An omniazimuthal visual system, comprising:
   an optical system capable of instantaneously obtaining an image of 360° view field area therearound and capable of central projection transformation for acquiring the image;
   an imaging section for converting the image obtained through the optical system into image data represented by polar coordinates;
   an image transformation section for transforming the image data into display data represented by rectangular coordinates;
   a display section for displaying a transformed image based on the display data from the image transformation section; and a display control section for controlling the transformed image to be displayed on the display section, wherein the image transformation section includes at least one buffer memory for temporarily storing the image data and the display data, an arithmetic/logic circuit for performing coordinate transformation of a polar coordinate when the image data is transformed into the display data as a rectangular coordinate with reference to a lookup table of a trigonometric function, and a CPU for controlling the at least one buffer memory, the arithmetic/logic circuit, and the lookup table;

and wherein the arithmetic/logic circuit is formed only by linear operation circuits.

2. An omniazimuthal visual system according to claim 1, wherein the image transformation section includes any of a function for transforming the image data into the display data for generating a panoramic image, a function for transforming the image data into the display data for generating a perspective image, a function for determining a transformation region of the image data, a zoom-in/zoom-out function, and a pan/tilt function.

3. An omniazimuthal visual system according to claim 2, wherein the image transformation section transforms the image data which has undergone zoom-in/zoom-out processing by the zoom-in/zoom-out function or pan/tilt processing by the pan/tilt function into the display data for generating a panoramic image or the display data for generating a perspective image.

4. An omniazimuthal visual system according to claim 1, wherein:

the optical system includes a hyperboloidal mirror having a hyperboloidal shape of one sheet of a two-sheeted hyperboloid;

a rotation axis of the hyperboloidal mirror is identical with an optical axis of an imaging lens included in the imaging section; and a first principal point of the hyperboloidal mirror.

5. An omniazimuthal visual system according to claim 1, wherein:

the optical system includes a plurality of mirrors each having a shape of a surface of revolution, the plurality of mirrors including first and second mirrors; and the optical system is structured such that the rotation axis of the plurality of mirrors is identical with an optical axis of an imaging lens included in the imaging section, a first principal point of the imaging lens is located at a focal point of the second mirror, and light which travels toward a focal point of the first mirror is reflected by the first mirror and, thereafter, reflected by the second mirror so as to reach the first principal point of the imaging lens included in the imaging section.

6. An omniazimuthal visual system according to claim 1, wherein the imaging section is a digital imaging section for transforming the image into digital image data.

7. An omniazimuthal visual system according to claim 1, further including an image recording section for recording an output from the imaging section, wherein the image recording section is a digital recording section.

8. An omniazimuthal visual system according to claim 1, wherein the CPU includes a parallel operation function for controlling the display control section, the image transformation section and the display section.

9. The omniazimuthal visual system of claim 1, wherein the arithmetic/logic circuit is a panoramic transformation circuit which only requires changing one parameter of the image in order to alternatively perform a pan function using the image data output from the imaging section.

10. The omniazimuthal visual system of claim 1, wherein the arithmetic/logic circuit is a perspective transformation circuit which only requires changing two parameters of the image in order to alternatively perform a pan/tilt function, or which only requires changing one other parameter of the image in order to alternatively perform a zoom-in/zoom-out function, using the image data output from the imaging section.

* * * * *